United States Patent
Kumar et al.

(10) Patent No.: US 10,783,048 B2
(45) Date of Patent: *Sep. 22, 2020

(54) HIGH PERFORMANCE PERSISTENT MEMORY

(71) Applicant: Intel Corporation, Santa Clara, CA (US)

(72) Inventors: Mohan J. Kumar, Aloha, OR (US); Murugasamy K. Nachimuthu, Beaverton, OR (US); George Vergis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 15/728,414

(22) Filed: Oct. 9, 2017

(65) Prior Publication Data

US 2018/0032414 A1    Feb. 1, 2018

Related U.S. Application Data

(63) Continuation of application No. 14/752,585, filed on Jun. 26, 2015, now Pat. No. 9,792,190.

(51) Int. Cl.

| | |
|---|---|
| *G06F 11/20* | (2006.01) |
| *G06F 3/06* | (2006.01) |
| *G06F 11/30* | (2006.01) |
| *G06F 11/14* | (2006.01) |
| *G06F 11/00* | (2006.01) |

(52) U.S. Cl.
CPC ........ *G06F 11/2069* (2013.01); *G06F 3/0619* (2013.01); *G06F 3/0647* (2013.01); *G06F 3/0685* (2013.01); *G06F 11/00* (2013.01); *G06F 11/1441* (2013.01); *G06F 11/3034* (2013.01);

(Continued)

(58) Field of Classification Search
CPC ............. G06F 11/2015; G06F 11/2069; G06F 11/1402; G06F 11/1469; G06F 12/0246; G06F 12/0868

See application file for complete search history.

(56) References Cited

U.S. PATENT DOCUMENTS

| | | | | |
|---|---|---|---|---|
| 4,858,101 A | * | 8/1989 | Stewart ................ | G05B 19/052 700/2 |
| 6,177,956 B1 | * | 1/2001 | Anderson ............ | H04N 1/2141 348/207.99 |

(Continued)

FOREIGN PATENT DOCUMENTS

EP      2597645 A2    5/2013

OTHER PUBLICATIONS

International Search Report and Written Opinion for PCT Application No. PCT/US2016/031893 dated Aug. 19, 2016, 15 pages.

(Continued)

*Primary Examiner* — Nadeem Iqbal
(74) *Attorney, Agent, or Firm* — Compass IP Law PC (57) ABSTRACT

Embodiments are generally directed to high capacity energy backed memory with off device storage. A memory device includes a circuit board; multiple memory chips that are installed on the circuit board; a controller to provide for backing up contents of the memory chips when a power loss condition is detected; a connection to a backup energy source; and a connection to a backup data storage that is separate from the memory device.

16 Claims, 9 Drawing Sheets

(52) U.S. Cl.
CPC ...... *G06F 11/3058* (2013.01); *G06F 11/2015* (2013.01); *G06F 2201/82* (2013.01)

(56) References Cited

U.S. PATENT DOCUMENTS

| | | | | |
|---|---|---|---|---|
| 8,037,380 | B2* | 10/2011 | Cagno | G06F 11/1064 |
| | | | | 711/118 |
| 8,566,639 | B2* | 10/2013 | Moshayedi | G11O 5/141 |
| | | | | 714/14 |
| 8,755,243 | B2* | 6/2014 | Hauck | G11O 5/141 |
| | | | | 365/226 |
| 9,013,946 | B2* | 4/2015 | Sartore | G11C 5/141 |
| | | | | 365/185.29 |
| 9,251,047 | B1 | 2/2016 | McKelvie et al. | |
| 9,342,423 | B2* | 5/2016 | Judd | G06F 11/2284 |
| 9,348,705 | B1* | 5/2016 | Wu | G06F 11/1666 |
| 9,390,767 | B2* | 7/2016 | Sweere | G06F 12/0866 |
| 9,501,404 | B2 | 11/2016 | Palmer et al. | |
| 2004/0190210 | A1 | 9/2004 | Leete | |
| 2005/0132250 | A1 | 6/2005 | Hansen et al. | |
| 2006/0015683 | A1* | 1/2006 | Ashmore | G06F 1/3203 |
| | | | | 711/113 |
| 2010/0008175 | A1* | 1/2010 | Sweere | G06F 12/0866 |
| | | | | 365/229 |
| 2010/0202240 | A1* | 8/2010 | Moshayedi | G11O 5/04 |
| | | | | 365/229 |
| 2010/0205348 | A1 | 8/2010 | Moshayedi et al. | |
| 2010/0332897 | A1 | 12/2010 | Wilson | |
| 2011/0072430 | A1 | 3/2011 | Mani | |
| 2012/0210163 | A1 | 8/2012 | Cho | |
| 2013/0142001 | A1* | 6/2013 | Sweere | G06F 12/0866 |
| | | | | 365/229 |
| 2014/0215277 | A1* | 7/2014 | Judd | G06F 11/2284 |
| | | | | 714/42 |
| 2014/0281661 | A1 | 9/2014 | Milton et al. | |
| 2014/0365715 | A1* | 12/2014 | Lee | G06F 12/0246 |
| | | | | 711/103 |
| 2015/0248935 | A1* | 9/2015 | Moshayedi | G11O 5/14 |
| | | | | 711/103 |

OTHER PUBLICATIONS

Supplementary European Search Report for Patent Application No. 16814880.7, dated Mar. 18, 2019, 11 pages.
Taiwanese and English Translation of Search Report of R.O.C. for Patent Application No. 105114179, dated Jan. 9, 2020, 2 pages.

* cited by examiner

HIGH PERFORMANCE PERSISTENT MEMORY

CROSS-REFERENCE TO RELATED APPLICATIONS

This application is a continuation of U.S. patent application Ser. No. 14/752,585 filed Jun. 26, 2015, which is incorporated by reference in its entirety.

TECHNICAL FIELD

Embodiments described herein generally relate to the field of electronic devices and, more particularly, to persistent memory solutions with volatile memory performance.

BACKGROUND

Computing processing may be required in varying types of operations, and varying types of computer memory may be selected depending on the particular operation. In certain operation, there is advantage in utilizing non-volatile memory for at least a portion of the operational memory, in addition to or as a substitute for volatile memory such as DRAM (Dynamic Random Access Memory).

A computing system typically includes both volatile and non-volatile memory. The contents of volatile memory are no longer available when power is removed from the volatile memory device as the volatile memory doesn't retain contents without power. Typically upon detection of loss of power, contents of the volatile memory are moved to non-volatile memory. Both volatile and nonvolatile types of memory are provided because access to volatile memory is faster than access to non-volatile memory.

A memory module such as a dual in line memory module (DIMM) includes a plurality of memory devices. The memory devices may include both volatile and non-volatile memory devices.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are generally directed to high performance persistent memory.

For the purposes of this description:

"Main memory" or "primary memory" is computer memory that a processor or computer primarily accesses for programs and data. Main memory is commonly volatile memory, such as dynamic random access memory (DRAM).

"Non-volatile memory" means memory that retains a stored value without connection to a power source. Non-volatile memory may include, but is not limited to, NAND memory included in non-volatile memory chips, NOR memory, or other suitable non-volatile memory, such as, phase change memory (PCM), a byte addressable three dimensional cross point memory, a resistive memory, nanowire memory, ferro-electric transistor random access memory (FeTRAM), magnetoresistive random access memory (MRAM) memory that incorporates memristor technology, spin transfer torque (STT)-MRAM, byte addressable random access non-volatile memory, and other technologies. As used herein, NAND memory may be referred to as "NAND".

"DIMM", or "Dual In-line Memory Module", means a module including a circuit board and multiple computer memory integrated circuits (ICs, also referred to as memory chips), where the circuit board includes separate electrical contacts on each side of the circuit board to enable the installation of electrical elements on each side. A DIMM including at least some DRAM components may be referred to DRAM DIMM As used herein, NVDIMM is a category or type of DRAM DIMM. NVDIMM units typically include DRAM devices that interface to a memory controller, together with a non-volatile memory such as NAND memory. During a power fail condition, the contents of the DRAM are saved to the nonvolatile memory by the memory controller However, conventional devices are limited in capacity due to the fact that a NVDIMM contains both the DRAM media and nonvolatile memory media, thus reducing the amount of physical space available within the DIMM for the DRAM media. Due to this limitation, the memory capacity of a NVDIMM device is significantly less than a capacity of a DIMM that contains only DRAM devices.

In some embodiments, a hybrid memory module (which may be referred to herein as an "HMM") is a memory module to provide persistent memory to retain data values through use of off module storage. In some embodiments, a hybrid memory module addresses limitations of NVDIMM devices by providing persistent memory that stores contents of volatile memory in a separate storage media. In doing so, this also enables the storage media to be shared across multiple hybrid memory modules, rather than requiring each memory module to include a separate storage media within the memory module.

In contrast with conventional memory devices, an embodiment of energy backed hybrid memory module with off module storage provides novel mechanisms to utilize DIMM devices with the addition of data persistence, thus allowing for maintaining the DRAM memory performance while also providing data persistence.

Figure 1:
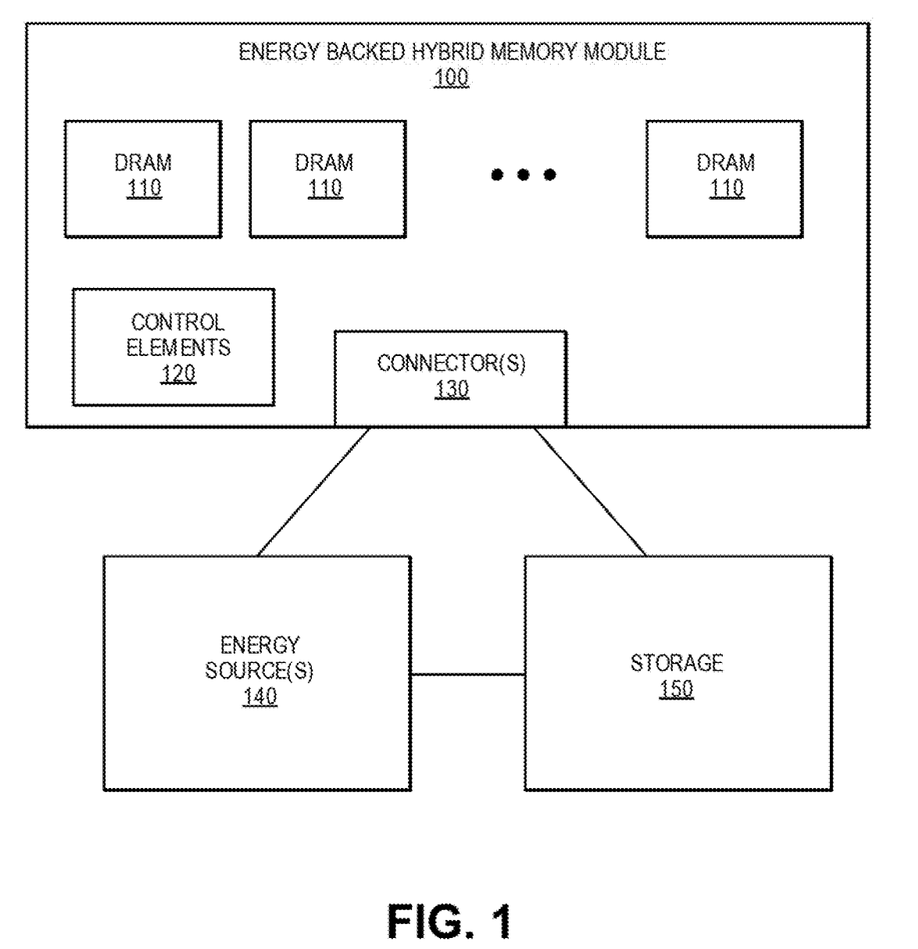
FIG. 1 is an illustration of an embodiment of an energy backed hybrid memory module with off module storage.

FIG. 1 is an illustration of an embodiment of an energy backed hybrid memory module with off module storage. In some embodiments, an energy backed hybrid memory module 100 includes a plurality of memory chips (such as DRAM memory integrated circuits) 110 for the storage of data, and control elements, shown as control 120, to provide for the storage of data from the hybrid memory module 100 to an off module data storage 150 (which may also be referred to herein as a backup data storage). The hybrid memory module 100 may include, but is not limited to, a DIMM structure and may be referred to herein as a hybrid memory module, or hybrid DIMM. The off module data storage 150 may include, but is not limited to, a solid state drive (SSD).

In some embodiments, the hybrid memory module 100 and data storage 150 are coupled with one or more energy sources (which may also be referred to herein as backup energy sources) to allow for operation after the loss of power to an apparatus and system containing such elements. In some embodiments, the one or more energy sources 140 may include, but are not limited to, one or more supercapacitors that are charged during operation, and that utilize the charge to maintain operation of the hybrid memory module 100 and data storage 150 during a storage of data from the DRAM 110 to the storage 150. As used herein, a "supercapacitor" device (also referred to herein as a "supercap") is a high-capacity electrochemical capacitor, and which may also be referred to as an "ultracapacitor". In some embodiments, the one or more energy sources may alternatively include a rechargeable battery or other renewable energy source, or a combination of energy sources.

In some embodiments, a user or manufacturer may select a partial range of memory to be power protected (saved and restored) by the energy backed hybrid memory module 100. In this manner, the off module data storage may have a smaller capacity than the memory 110 in case, for example, the user or manufacturer wishes to utilize a smaller storage element without needing to replace the hybrid memory module 100 to match the storage capacity.

Figure 2:
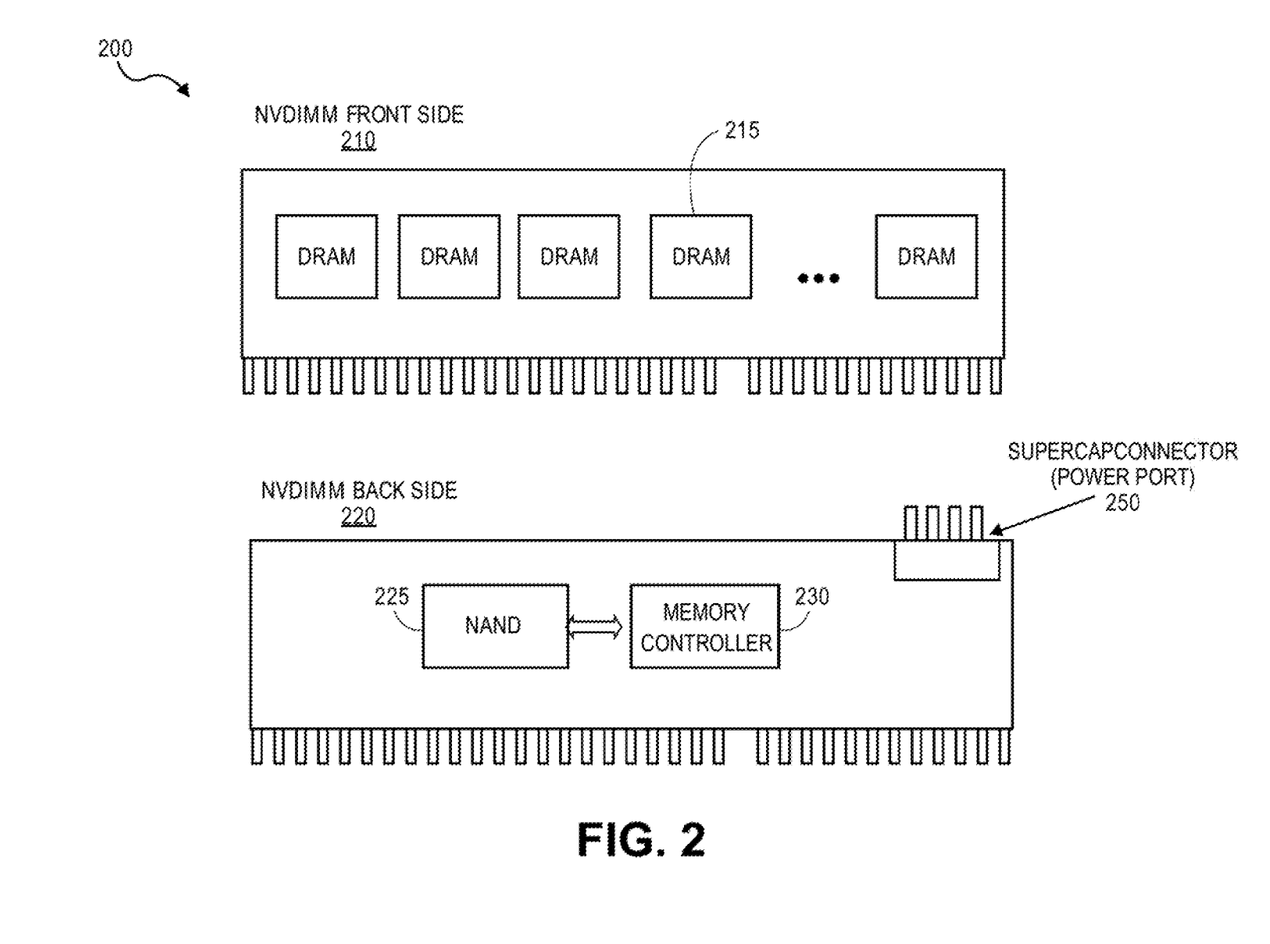
FIG. 2 is an illustration of an NVDIMM memory device.

FIG. 2 is an illustration of an NVDIMM device. The NVDIMM 200 as shown in FIG. 2 contains DRAM integrated circuits 215 on one side of the memory module, illustrated as the NVDIMM front side 210, and includes NAND memory (or other nonvolatile memory) 225 (which may include a NAND controller), and the memory controller 230 (which may be an FPGA, field-programmable gate array, ASIC, application-specific integrated circuit, or other controller) on the other side of the memory module, illustrated as the NVDIMM back side 220. The NVDIMM further includes a connection to a backup power source, such as supercapacitor connector 250, which provides a power port, illustrated as including two ground pins and two power (such as 12 volt) connectors.

In operation, the memory controller 230 may detect a power failure, and in response to the power failure operate to copy the data contents of the DRAM 215 to the NAND 225. Further, the supercapacitor power source is charged during operation, and is intended to provide sufficient power to allow for the storage of data from the DRAM memory to the NAND storage.

During a power on event, after the MRC (Memory Reference Code) initializes the DRAM, the MRC requests the memory controller 230 to restore the DRAM contents from the NAND 225. The BIOS (Basic Input/Output System) represents the System Physical Address (SPA) occupied by the NVDIMM as persistent memory (in E820/UEFI Get Memory Map and NVDIMM Firmware Interface Table (NFIT) ACPI Table) and represents the NVDIMM as NVM (non-volatile memory) devices through ASL code. The OS (operating system) understands these SPA ranges as persistent or volatile memory and exposes to application/workloads accordingly.

NVDIMM devices currently available contain DRAM devices on one side of the DIMM; and the NAND device and the memory controller on the other side of the DIMM. The NVDIMM is connected with a supercapacitor, which acts as temporary power source on DIMM power failure. When the system power goes down, the DRAM contents are stored in the NAND, with such contents being restored to the DRAM during memory initialization in the next boot up of the system containing the NVDIMM.

However, issues with the apparatus as illustrated in FIG. 2 may include:

(1) The NVDIMM has DRAM integrated circuits on a front side 210, and NAND storage 225 and the memory controller 230 on a back side 220, as illustrated in FIG. 2. Hence, the total capacity of the device is reduced due to the real-estate that is occupied by the NAND 225 and memory controller 230, which limits the amount of DRAM memory available.

(2) The data stored in the NAND 225 is the data as stored in the DRAM. However, address/data scrambling seeds change between boots of a system due to signal integrity variations. For this reason, NVDIMMs generally do not provide for address or data scrambling, using Address/Data scrambling disabled mode, which thus can result in hot spots in memory (where a particular memory location is used for storage consistently) or more errors in the memory subsystem if certain portions of memory are prone to errors.

(3) NAND device management is generally rudimentary in comparison with the management that is available for larger storage devices, which results in low quality RAS (Reliability, Availability, and Serviceability).

(4) When either a DRAM IC 215 or the NAND IC 225 fails, this requires that the whole device 200 be replaced, thus increasing cost of ownership.

(5) With regard to manufacturing cost, the overall cost of a NVDIMM solution is approximately three to four times the cost of a similarly sized DRAM DIMM.

(6) Data stored on the NVDIMM 200 is generally not protected as data is simply copied from the DRAM 215 to the NAND 225 in a power failure, and as a result moving NVDIMM from one system to another could inadvertently make the data stored on the NAND 225 accessible.

Figure 3:
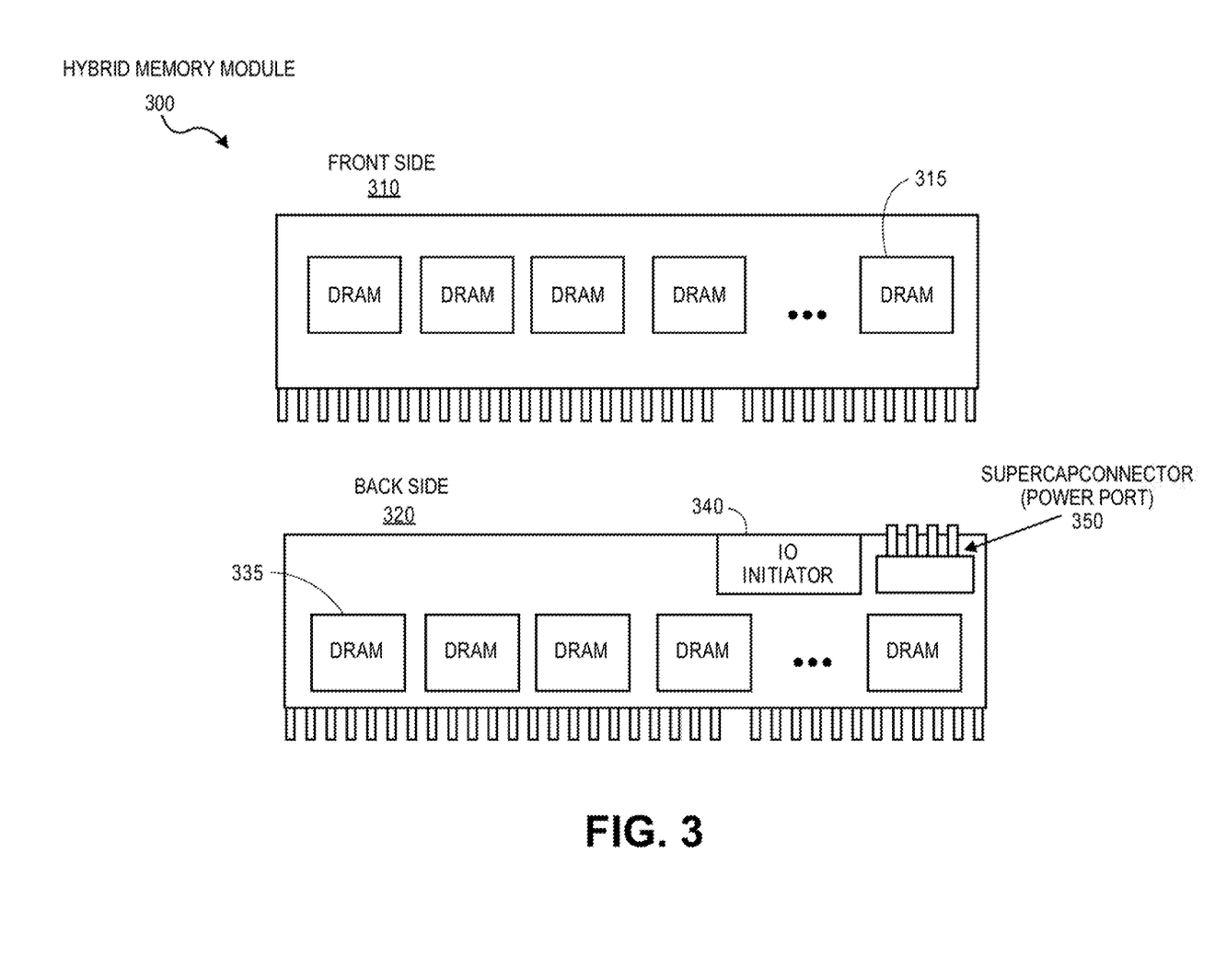
FIG. 3 is an illustration of an embodiment of an energy backed hybrid memory module with off module consolidated storage.

FIG. 3 is an illustration of an embodiment of an energy backed hybrid memory module with off module consolidated storage. In some embodiments, an embodiment of a memory device includes a hybrid memory module 300 with the backing storage media off the NVDIMM as illustrated in FIG. 3. In some embodiments, the hybrid memory module 300 includes a front side 310 with a first set of DRAM integrated circuits 315 and a back side 320 with a second set of DRAM integrated circuits 335. As illustrated, the back side 320 further includes an IO initiator 340 and a supercapacitor connector 350 providing a power port. While the connector in this implementation is designated as a supercapacitor connector, embodiments are not limited to this energy source, and may alternatively include a connection to a rechargeable battery or other renewable energy source, or a combination of energy sources.

In some embodiments, the structure of the hybrid memory module allows for fabrication of high capacity persistent memory to retain data values without compromising on capacity because addition space on the hybrid memory module is available for DRAM with the backing storage being off module.

In some embodiments, the energy backed elements as illustrated in FIG. 3 may be included in each DIMM of a computing system, wherein the system may choose whether or not to implement the backup functionality of the apparatus. Thus, each such memory device may be utilized either as an energy backed hybrid memory module or as a DRAM DIMM depending on the implementation in a system.

Figure 4:
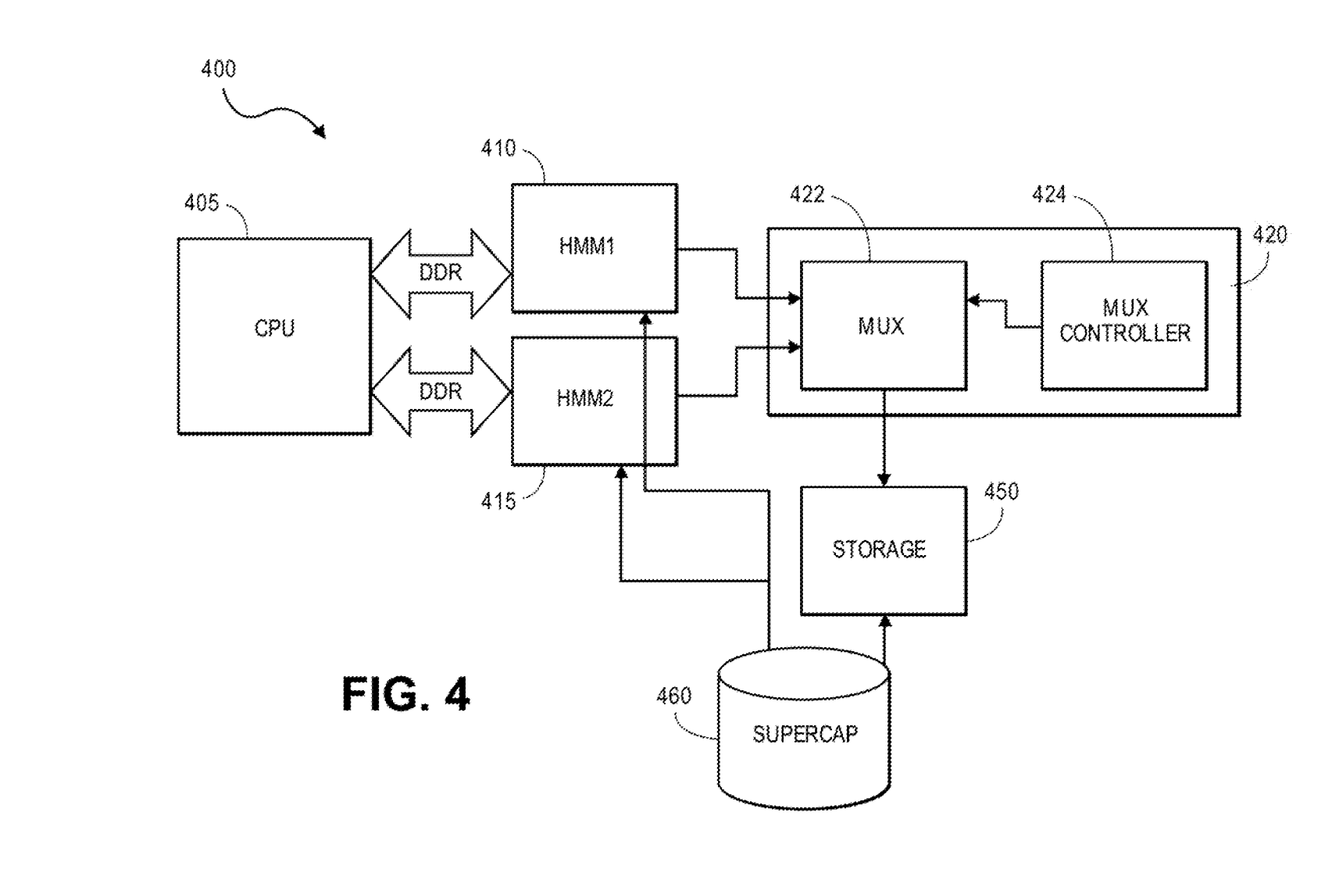
FIG. 4 is an illustration of an embodiment of a system including energy backed hybrid memory modules with off module consolidated storage.

FIG. 4 is an illustration of an embodiment of an apparatus or system including energy backed hybrid memory modules with off module consolidated storage. As illustrated, an apparatus or system 400 includes one or more processors, illustrated as CPU (Central Processing Unit) 405, coupled with one 415 coupled via DDR (Double Data rate) links. Each of the hybrid memory modules 410-415 (HMM1 and HMM2, where HMM refers to a hybrid memory module) may be the hybrid memory module 300 as illustrated in FIG. 3.

The HMM1 and HMM2 modules are coupled to storage controller 420, which provides control operation for the storage of data in the apparatus 400 on power failure. As illustrated, the storage controller 420 includes a multiplexer 422 and a multiplexer controller to select the hybrid memory modules one at a time for storage of data from each module to off module storage 450. In some embodiments, the storage controller 420 may be a portion or subsystem of a data and power control unit.

In some embodiments, the hybrid memory modules 410-415 and the off-module storage, including storage controller 420 and storage, 450 are coupled with a backup energy source, which may include, but is not limited to, a supercapacitor subsystem (including one or more supercapacitors) 460, to provide the power necessary to save the data stored on the hybrid memory modules 410-415 to the storage 450. By moving the storage media off the hybrid memory modules 410-415 to storage 450, the apparatus 400 allows for multiple hybrid memory modules to share the storage capacity of storage 450, which thus enables lowering the overall cost of the hybrid memory module solution.

In some embodiments, the apparatus or system 400 includes:

(1) A controller on each of the hybrid memory modules 410-415 for copying the contents of its DRAM media on a power failure, such as IO initiator 340 illustrated in FIG. 3.

(2) A storage controller 420 with storage media 450 behind it acting as the off-module storage.

(3) A supercapacitor subsystem 460 or other energy source to provide energy to both hybrid memory modules and off-module storage on system power loss condition.

(4) A consolidated storage solution that consists of multiplexing logic and sequencer that allows multiple hybrid memory modules to share the storage media. Sequencing logic ensures that only one hybrid memory module is able to write to the storage media at a given time.

Referring again to FIG. 4, on system Power Fail, the controller on hybrid memory modules 410-415 on the system 400 are informed of the power failure via a SAVE_n signal (or other notification). In some embodiments, in response to the SAVE_n signal, the hybrid memory module controller is to arbitrate to gain access to the storage controller to start the save operation for the hybrid memory module. The sequencing logic provides access to one hybrid memory module at a time. A choice of hybrid memory module sequence may be based upon a priority that is assigned to each module, but embodiments are not limited to priority sequencing and may use other factors to determine the sequencing of memory module units. The hybrid memory module that was successful in the arbitration (HMM1 in this example) starts the save operation for the device. Once HMM1 completes its save, HMM1 relinquishes access to the multiplexer, allowing HMM2 to win its arbitration. In some embodiments, the supercapacitor subsystem 460 provides sufficient power to storage controller 420 to allow all provisioned hybrid memory modules to complete their save operation. In some embodiments, each hybrid memory module save is tagged with metadata that allows the storage controller 420 to associate the saved image with the corresponding hybrid memory module. In some embodiments, on platform power on, the hybrid memory modules 410-415 once again arbitrate for access to storage controller 420 to restore their respective saved images from the storage 460 to the DRAM of each hybrid memory module.

While the above describes multiple memory modules arbitrating for commencing save operations to push data to storage, embodiments are not limited to this implementation. In other embodiments, a system may be implemented to instead pull data from the hybrid memory modules, with the storage control providing instructions to the hybrid memory modules to obtain the data from such modules in a certain sequence.

In some embodiments, a system 400 may provide for additional power efficiency by removing power from each hybrid memory module upon completion of the storage of data from the hybrid memory module into the storage 450. For example, upon a power failure, power is provided by the supercap 460 to HMM1 410 and HMM2 415. If the selected sequence causes HMM1 to be chosen before HMM2, power is removed from HMM1 upon the completion of the storage of data from HMM1 to storage 450, and then power is removed from HMM2 upon the completion of the storage of data from HMM2 to storage 450. In some embodiments, additional power efficiency is provided by isolating the hybrid memory modules from any other connection upon a power loss.

In some embodiments, additional savings in power may be accomplished by compressing the data from each hybrid memory module upon a power failure such that the time required to back up the data to storage is reduced.

Figure 5:
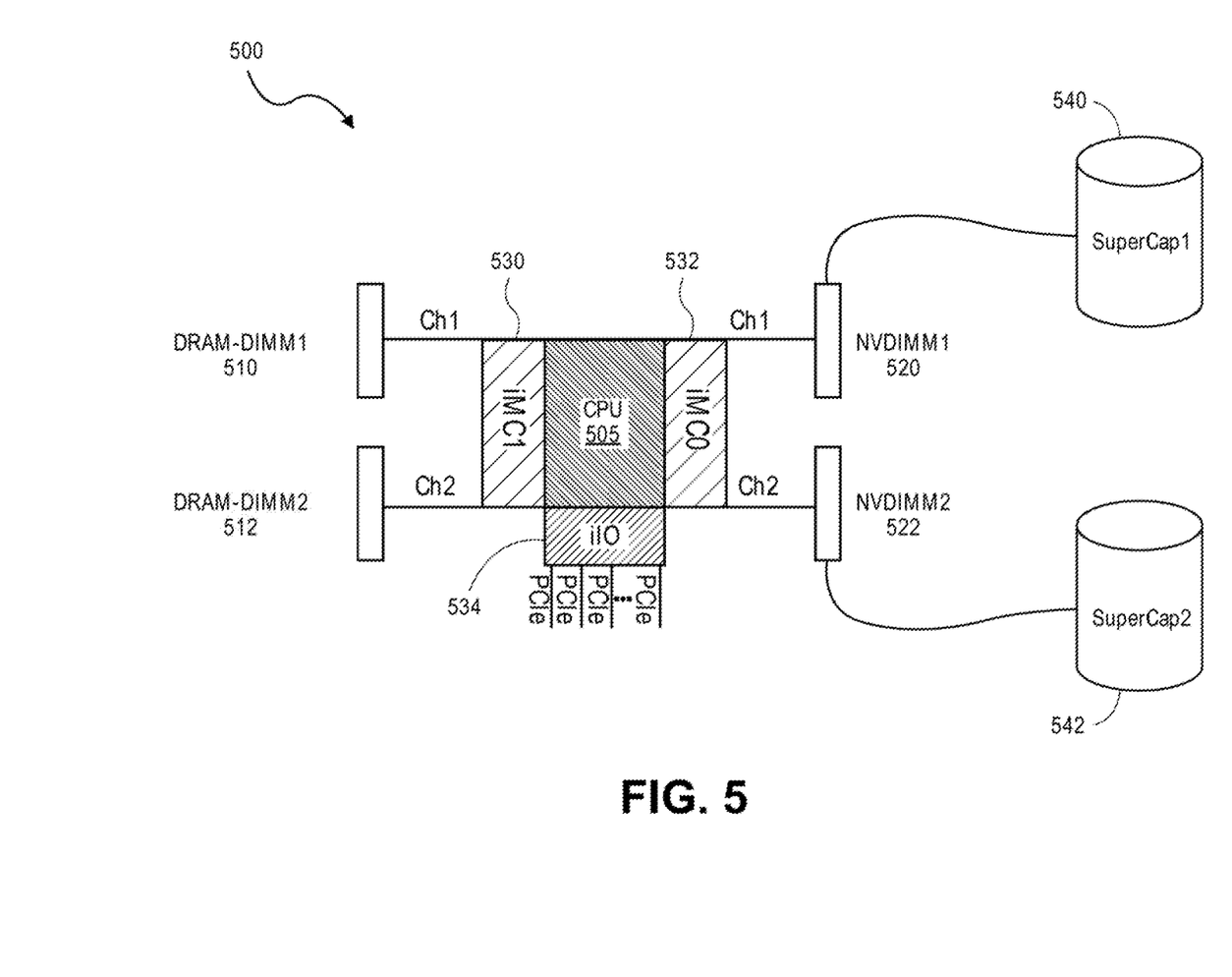
FIG. 5 is an illustration of a system utilizing NVDIMM devices.

FIG. 5 is an illustration of a system utilizing NVDIMM devices. FIG. 5 illustrates a computing system 500 with CPU 505 with two integrated Memory Controllers (iMC), with two NVDIMM devices, illustrated as NVDIMM1 520 and NVDIMM2 522, that are populated on iMC0 532; and two DRAM DIMMs, illustrated as DRAM-DIMM1 510 and DRAM-DIMM2 512, populated on iMC1 530. DRAM-DIMM1 and NVDIMM1 are on channel 1, and DRAM-DIMM1 and NVDIMM1 are on channel 2. Also illustrated is integrated IO, iIO 534, coupled with PCIe (Peripheral Component Interconnect Express) connections.

As further illustrated, each NVDIMM is attached to a supercapacitor, with NVDIMM1 520 being coupled with Supercapacitor1 540 and NVDIMM1 522 being coupled with Supercapacitor2 542. The supercapacitors are charged during platform power up and may supply power to each NVDIMM on power failure.

Figure 6:
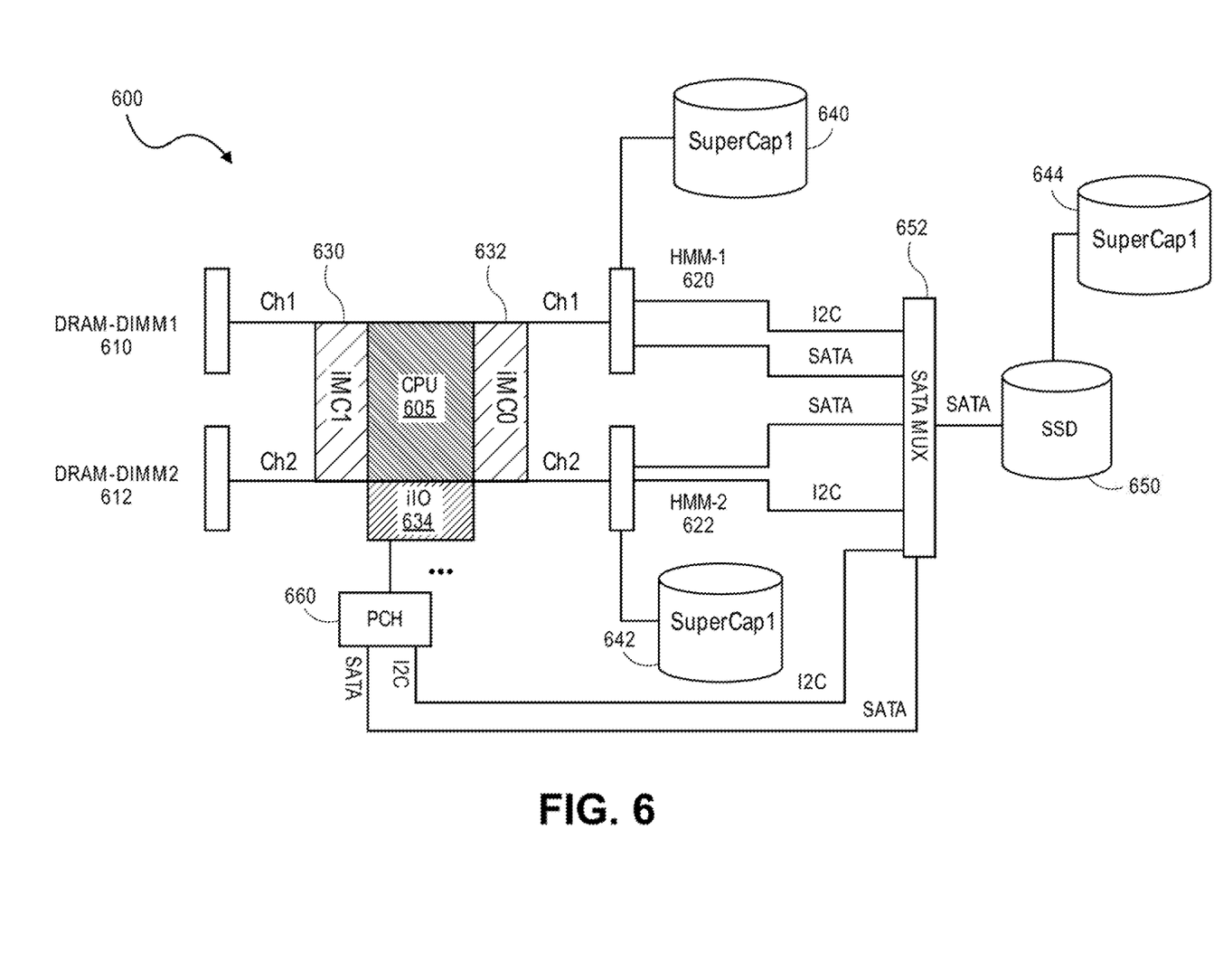
FIG. 6 is an illustration of an embodiment of a system including energy backed hybrid memory modules with off device consolidated storage.

FIG. 6 is an illustration of an embodiment of a system including energy backed hybrid memory modules with off module consolidated storage. In some embodiments, a computing system 600 with CPU 605 includes two integrated Memory Controllers (iMC), with two hybrid memory devices, illustrated as HMM1 620 and HMM2 622, that are populated on iMC0 632; and two DRAM DIMMs, illustrated as DRAM-DIMM1 610 and DRAM-DIMM2 612, populated on iMC1 630. DRAM-DIMM1 and HMM1 are on channel 1, and DRAM-DIMM2 and HMM2 are on channel 2. While the DRAM-DIMM and hybrid memory devices are implemented and handled differently in the computing system 600, in some embodiments the DRAM-DIMM devices, instead of being conventional DRAM devices, also include the energy backed elements such as illustrated in FIGS. 1 and 3, wherein the implementation of the DIMM devices may determine whether the devices are treated as volatile memory or persistent, energy backed memory. Thus, DRAM-DIMM1 610 and DRAM-DIMM2 612 may be physically equivalent to HMM1 620 and HMM2 622.

In some embodiments, HMM1 620 and HMM2 622 are each coupled with I²C and a serial interface such as SATA (Serial ATA) links to a SATA multiplexer 644, which is coupled with a storage element, such as SSD 650. Further, the CPU 605 is coupled with integrated IO (iIO) 634, which is further coupled with PCH (Platform Controller Hub) 660, the PCH 660 being further coupled with I2C and SATA links to the SATA multiplexer 644. While SATA links are provided for illustration in FIG. 6, embodiments are not limited to this implementation, and the storage interface may alternatively be PCIe (Peripheral Component Interconnect Express), wherein PCIe may be coupled with iIO 634 of CPU 605, or other suitable high speed serial interface, such as USB (Universal Serial Bus) 3.0™, Firewire™, or other interface, coupled with PCH 660, iIO 634, or an IO device that is coupled with CPU 605.

In some embodiments, each HMM 620-622 and the SSD 650 are coupled with a backup energy source, which may include, but is not limited to, a supercapacitor subsystem, to provide power for saving of data in a power failure condition, this being illustrated as HMM1 620, HMM2 622, and SSD 650 being coupled with Supercapacitor1 640, 642, and 644 respectively, wherein Supercapacitor1 represents a backup power apparatus or subsystem that may include one or more supercapacitors (or other energy sources). In some embodiments, Supercapacitor1 charges during platform power up and supplies backup power to each hybrid memory device and the SSD storage upon power loss for the computing system 600.

In some embodiments, the computing system 600 provides both data capacity and data persistence, thus enabling the energy backed hybrid memory modules to be utilized for purposes such as, for example, memory databases. Further, by providing a consolidated storage solution across multiple hybrid memory modules, the system may implemented to reduce the overall cost of persistent memory solution for multiple hybrid memory module environments.

In some embodiments, an embodiment of an apparatus or system 600 including energy backed memory provides for the following:

(1) DRAM contents for the hybrid memory modules 620-622 are backed up to the SSD 650 on system power loss (such as system failure or system power down) and restored back to DRAM during platform power-up. In order to achieve this, the hybrid memory modules contain a SATA (Serial ATA) interface (or other serial interface), I²C interface, and supercapacitor connector for power protection of the DRAM data. The SATA and I²C interfaces are coupled with a power protected SATA drive, illustrated as SSD 650, through SATA multiplexer 644, which connects through I2C interface. The SATA multiplexer 644 allows multiple hybrid memory modules to be connected to a single SATA drive such that the drive may be utilized as a common storage for all hybrid memory modules. In some embodiments, the multiplexer 644 further includes a port that allows the SATA drive to be accessed by the host platform controller hub 660.

(2) When the platform power fails, the DRAM contents of the HMMs are saved to the SATA drive together with meta-data, wherein the saving operation may be implemented sequentially one hybrid memory module at a time. When the platform powers back on, the memory initialization code or DIMM SATA controller restores the contents of each hybrid memory module from the SSD storage, wherein the restoration of data from the SSD storage may also be performed sequentially one hybrid memory module at a time.

It is noted that, although the example provided herein uses a SATA SSD and I²C multiplexer, embodiments are not limited to this particular implementation, and may include any energy backed storage device, including any point to point, bus, or network based storage.

In some embodiments, an apparatus or system may provide the following benefits over existing NVDIMM based solutions:

(1) More Persistent DRAM Capacity: NVDIMM capacity available in a conventional system is significantly reduced due to the need to trade off a large portion of DRAM capacity (generally half of DRAM capacity, the amount of capacity on one side of a DIMM device) to accommodate the NAND storage and memory controller on the same DIMM form factor. Thus, the overall OS visible memory capacity is generally reduced by half, resulting in reduced workload performance. In some embodiments, the available real estate on the hybrid memory module is more effectively applied for DRAM by displacing the non-volatile storage to a location off the module. The repartitioned volatile and non-volatile memory may effectively double the OS visible persistent memory size in comparison with NVDIMM devices, resulting in improved workload performance.

(2) Low TCO (Total Cost of Ownership): A NVDIMM solution generally costs three to four times the cost of DRAM for purchase. In contrast, the cost for implementation of an embodiment of energy backed persistent memory is the cost of the DRAM plus the cost of the SSD (assuming a processor supports the power fail copy from DRAM to SSD feature). The cost of a high volume SSD is significantly less (roughly one-tenth) than the cost of DRAM for a similar capacity. In an example, the overall cost of persistent memory in an embodiment may be only approximately 1.2 times the cost of DRAM (assuming double DRAM capacity to the SSD provision).

(3) Low Service Cost: In a NVDIMM, the DRAM and NAND devices are on the same DIMM. If either one fails/degrades, the entire NVDIMM needs to be replaced. In contrast, in an embodiment of an apparatus or system including energy backed hybrid memory modules, the DRAM and storage devices are separate elements in the apparatus or system, and thus if either one of these elements fails or degrades, the failing or degrading device can be exchanged independently of the other device, hence reducing the service cost/TCO.

(4) Data Scrambling Supported: A data scrambling feature is important to reduce signal integrity noises due to memory hot spots, wherein data from memory controller (MC) to DRAM is scrambled with the address to reduce hot spots in memory. With existing NVDIMMs, the data from DRAM devices are stored to NAND and restored on the next power up. However, the NAND controller generally does not have visibility into how the MC scrambled the data. Existing NVDIMM may circumvent this issue by disabling the data scrambling, thus in turn losing the benefits of data scrambling.

In contrast, data stored in an embodiment of energy backed hybrid memory provides support for data scrambling. In some embodiments, the SATA interface on the hybrid memory module stores the contents to the SATA SSD with DRAM area allocated for BIOS to store meta-data such as DIMM interleave information and the data scrambling signature.

In some embodiments, when the platform is rebooted, the memory initialization code reads the SATA SSD contents and determines the scramble pattern and converts to actual data and stores to the DRAM. The BIOS also will detect the uncorrected errors based on ECC (Error Correction Code) and poison the memory locations that have errors. Hence, data stored in the SSD is not affected by the address/data scrambling feature. Thus, an embodiment may be implemented to provide improved RAS in comparison with an existing NVDIMM solution.

(5) Memory Interleave Changes: With NVDIMMs, if NVDIMM interleave changes, then it is very difficult for an application to obtain the previous data. For this reason, it is generally required to back-up the NVDIMM persistent data before any NVDIMM location change and restore the data. In some embodiments, because the BIOS restores the data from the off DIMM storage, the BIOS can re-assemble the data as long as enough DRAM capacity is present regardless of new interleave or DRAM DIMM change.

(6) High RAS (Reliability, Availability, and Serviceability): In existing NVDIMM devices, adding features such as bad block re-mapping, wear leveling, die-failure, etc., to the NAND controller increases the size of the FPGA or requires additional NAND devices, and thus increases the cost. For this reason, NVDIMMs generally do not provide high RAS capability. In contrast, an embodiment utilizes a standard SSD for off module storage, wherein an SSD normally contains features such as bad block re-mapping, wear leveling, die-failure, etc.

(7) Persistent Data Security: NVDIMM implementations generally do not offer protection of the stored data. For this reason, a user is able to move a NVDIMM from one system to other and then able to read the data without the author of the data providing any authorization. In some embodiments, an SSD or similar storage is utilized for storing the persistent data, and thus security mechanisms such as file encryption that are available today on the SSD could be utilized In some embodiments, an embodiment of an apparatus or system includes the following platform level solution that provides DRAM like performance with persistent memory functionality:

(1) Hybrid memory modules each contain a SATA (or other serial interface) controller, I²C controller, and the supercapacitor (or other energy source) connector, where the DRAM contents are power protected on platform power failure.

(2) SATA SSD and the SATA multiplexer logics are power protected using a supercapacitor or other energy source.

(3) Hybrid memory modules and SATA drivers are connected through a SATA multiplexer, which can be controlled by I²C port to switch to a specific hybrid memory module or to host through PCH SATA port.

(4) When the platform is powered on, the BIOS initializes the DIMM devices, including hybrid memory modules, as normal and understands which DIMMs contain the SATA ports by communicating with the DIMM controller.

(a) Each hybrid memory module that includes a SATA port is default programmed to not store data to the SSD, which function is enabled only after the BIOS completely restores the data back to the DRAM.

(5) The BIOS issues commands over I²C to steer the SSD to the appropriate DIMM SATA interface or to the PCH via SATA multiplexer with I²C control interface.

(6) The BIOS reads the contents of the SSD and its meta-data. If the DRAM contents are present, BIOS restores the contents to the appropriate DRAM.

(a) The BIOS examines the meta-data to determine the DRAM size interleave information and determine System Physical Address (SPA) ranges to copy the data. The BIOS examines the meta-data to determine the data scramble pattern and uses the pattern to restore the data from SSD to DRAM.

(b) If scrambling is disabled, the BIOS can request each hybrid memory module SATA controller to restore the DRAM data, or the BIOS can restore the data.

(c) The BIOS checks the ECC (Error Correction Code) of data and, if any uncorrected error or poison is detected, BIOS can use the error injection mechanism to inject error into the uncorrected error or poison location.

(d) The BIOS checks the health of the SSD and creates S.M.A.R.T data for the OS to be aware of the health of the DIMM back-up medium.

(e) If SATA security is enabled, the BIOS is required to first provide the appropriate passphrase to access the SATA data. In some embodiments, the passphrase may be stored in a secure container such as a TPM (Trusted Platform Module) to provide additional security.

(7) Once the data restore operation from SSD to DRAM is complete, the BIOS programs the hybrid memory modules to store DRAM contents to SSD and the BIOS switches the multiplexer to a first hybrid memory module. This process causes the SSD to not be visible to the OS.

(8) In some embodiments, when multiple hybrid memory modules share a SSD, the BIOS may select the storing order for the hybrid memory module to SSD and may program the order to the hybrid memory modules along with power failure watchdog timer.

(9) BIOS reports the persistent memory ranges to the OS.

(10) On power failure, the PCH receives the power fail condition and generates an SMI (System Management Interrupt).

(11) In some embodiments, the SMM (System Management Mode) code flushes the CPU caches and flushes iMC write pending queue.

(12) In some embodiments, the BIOS directs the PCH to signal power failure to the hybrid memory modules.

(13) Once the hybrid memory modules receive the power failure signal, the first hybrid memory module in sequence begins storing the contents to SSD. Once the store completes, it writes to SATA multiplexer to switch to a next hybrid memory module in the sequence of hybrid memory modules.

(14) The next hybrid memory module, once such hybrid memory module detects that it owns the SATA port, switches the SATA multiplexer to its port and starts saving the DRAM contents. At this point the hybrid memory module hand overs the storing process to the next following hybrid memory module in the sequence, and so on until all hybrid memory modules are handled.

Figure 7:
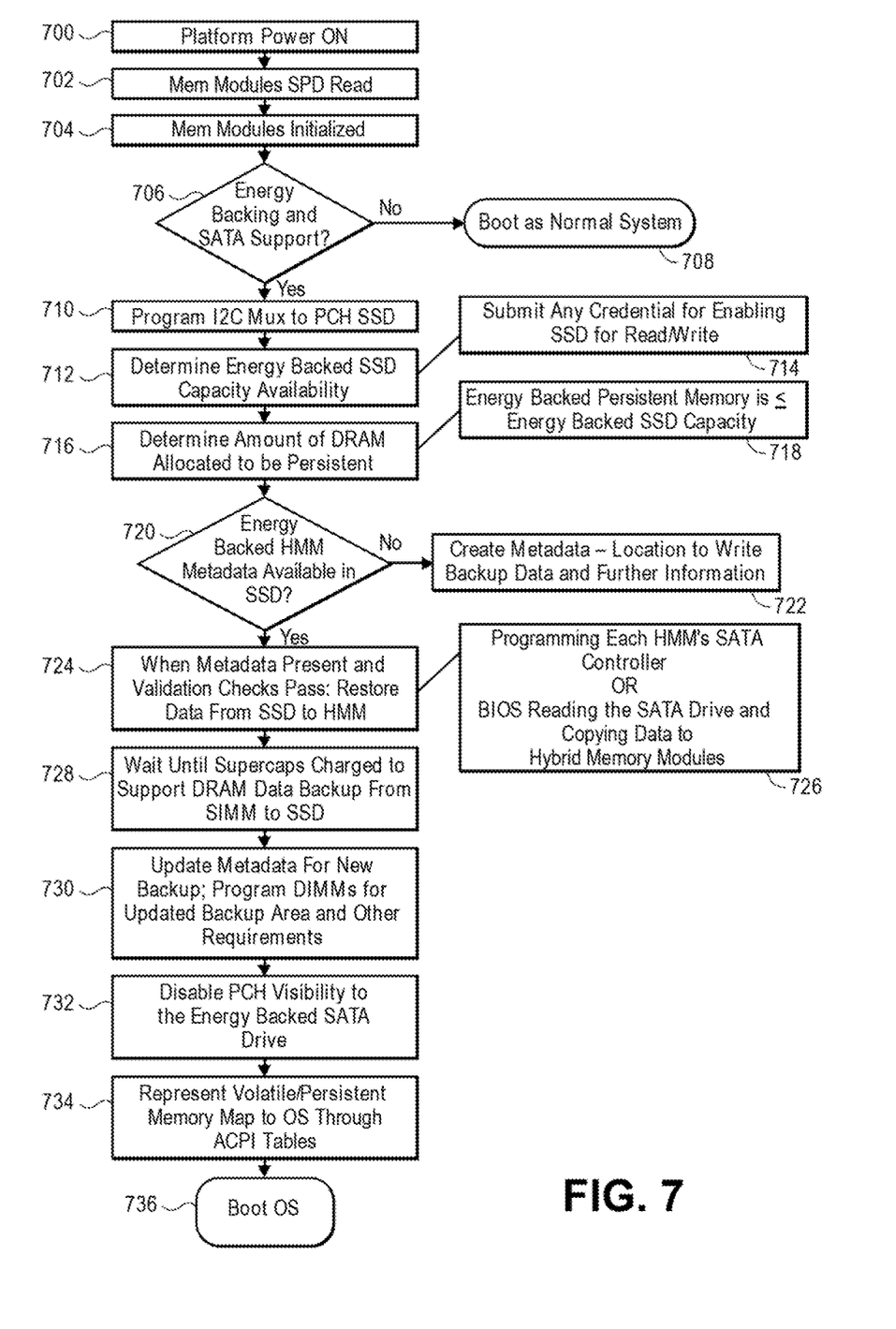
FIG. 7 is a flowchart to illustrate a process for recovery operations utilizing according to embodiment.

FIG. 7 is a flowchart to illustrate a process for recovery operations utilizing according to embodiment. The FIG. 7 shows the platform boot flow in an operation with energy backed hybrid memory modules with off device consolidated storage. In some embodiments, upon platform power being turned on 700, the hybrid memory module's SPD (serial presence detect) is read 702, and the hybrid memory modules are initialized 704.

If energy backing and SATA support is not provided in the system 706, then the system is booted as a normal system 708. Otherwise, if energy backing and SATA (or other serial interface) support is provided in the system 706 (wherein a system includes energy backed hybrid memory modules), then I²C multiplexer to PCH SSD is programmed 710. Energy backed SSD capacity availability is determined 712, with any credential for enabling the SSD for read and write operation being submitted 714. Further, the amount of DRAM allocated to be persistent is determined 716, with energy backed HMM persistent memory being less than or equal to the capacity of the energy backed SSD capacity 718.

In some embodiments, if energy backed HMM metadata is not available in the SSD 720, then the metadata is created to indicate location to write backup data and further information 722. When the metadata is present and validation checks are passed, the data is restored from the SSD to the hybrid memory modules 724.

In some embodiments, there is a wait until the one or more supercapacitors (or other energy sources) are sufficiently charged to support DRAM data backup from hybrid memory module to the SSD 728. Further, the metadata is updated for a new backup, and the hybrid memory modules are programmed for backup area and other requirements 730. PCH visibility is disabled to the energy backed SATA drive 732, the volatile/persistent memory map (indicating which memory modules provide persistent memory) is presented to the operating system such as through ACPI tables 734, and the operating system is booted 736 to commence operation.

Figure 8:
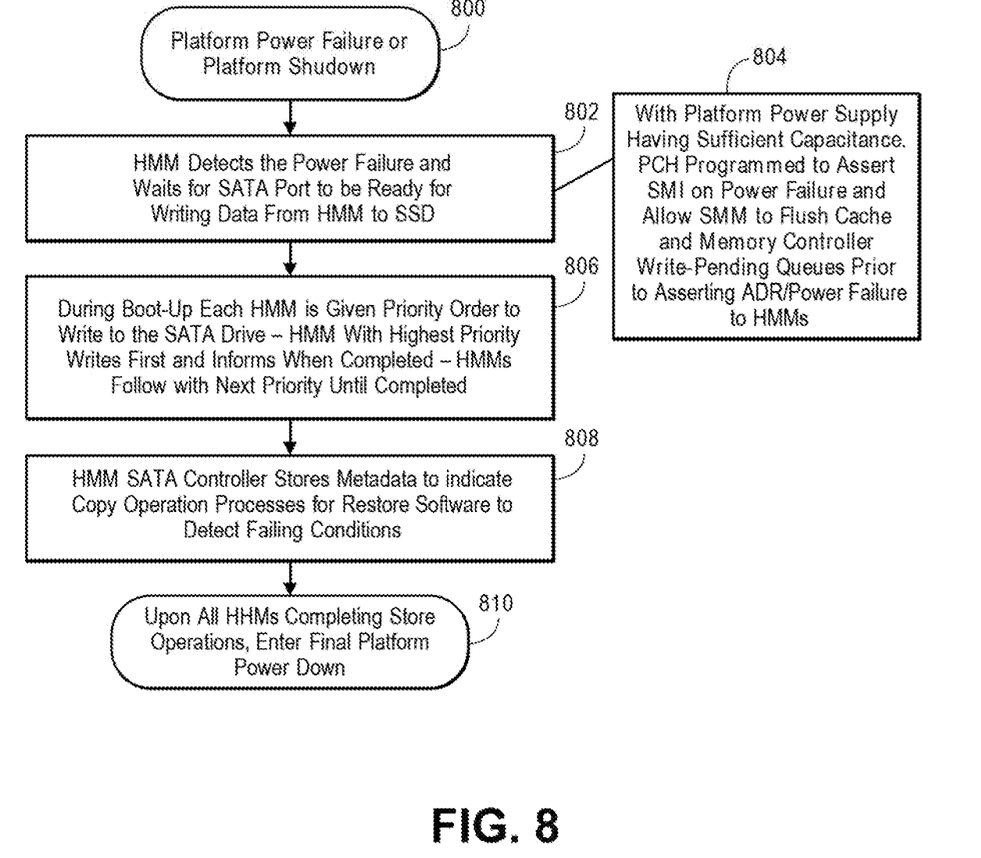
FIG. 8 is a flowchart to illustrate a process for memory operation in power loss circumstances according to embodiment.

FIG. 8 is a flowchart to illustrate a process for memory operation in power loss circumstances according to embodiment. FIG. 8 illustrates platform power fail/power down flow with an embodiment of a system or apparatus with energy backed hybrid memory modules with off module consolidated storage.

In some embodiments, upon a platform power failure or platform shutdown 800, a hybrid memory module detects a power loss (power failure or platform shutdown) 800, such as detecting the power loss by the reception of signal, and the DIMM waits for the SATA port to be ready for the writing of data from the DRAM of the hybrid memory module to the off module storage SSD 802. In some embodiments, a user or manufacturer may designate a partial range of memory to be power protected (saved and restored) by the energy backed non-volatile memory, and writing of data may be limited to such partial range of memory. In some embodiments, with the platform power supply having sufficient power, the PCH may be programmed to assert the SMI on power failure and allow the SMM to flush the cache and memory controller write-pending queues prior to asserting the ADR/power failure to the DRAM DIMMs.

In some embodiments, during boot-up each hybrid memory module is provided a priority order for writing to the SATA drive on failure. In such an embodiment, the hybrid memory module with the highest priority writes to the storage first and then informs when the storage process is complete. The process then continues with the hybrid memory modules in priority sequence until the storage process is completed 806. In some embodiments, the power to each hybrid memory module is removed upon the completion of the storage process for such hybrid memory module.

In some embodiments, the HMM SATA controller stores metadata to indicate copy operation processes to enable restore software to detect the failing conditions 808.

Upon all hybrid memory modules completing the store operations to the off module storage, the system enters final platform power down 810.

Figure 9:
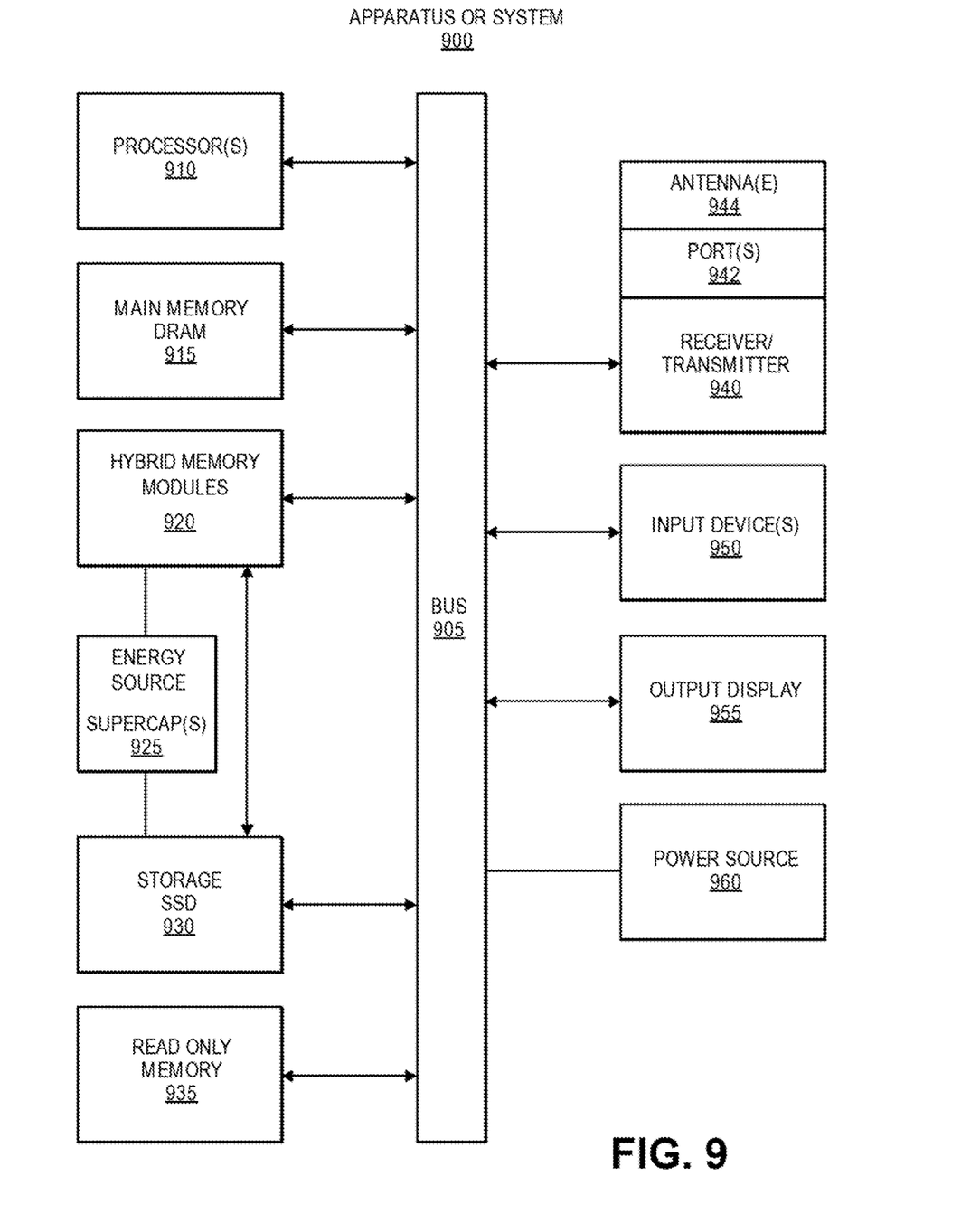
FIG. 9 is an illustration of an embodiment of an electronic apparatus or system including energy backed hybrid memory module with off module storage.

FIG. 9 is an illustration of an embodiment of an electronic apparatus or system including energy backed hybrid memory with off module storage. In this illustration, certain standard and well-known components that are not germane to the present description are not shown. Elements shown as separate elements may be combined, including, for example, an SoC (System on Chip) combining multiple elements on a single chip. The apparatus or system (referred to generally as a system 900) may include, but is not limited to, a computing system.

In some embodiments, the system 900 may include a processing means such as one or more processors 910 coupled to one or more buses or interconnects for processing information, shown in general as bus 905. The processors 910 may comprise one or more physical processors and one or more logical processors. In some embodiments, the processors may include one or more general-purpose processors or special-processor processors.

The bus 905 is a communication means for transmission of data. The bus 905 is illustrated as a single bus for simplicity, but may represent multiple different interconnects or buses and the component connections to such interconnects or buses may vary. The bus 905 shown in FIG. 9 is an abstraction that represents any one or more separate physical buses, point-to-point connections, or both connected by appropriate bridges, adapters, or controllers.

In some embodiments, the system 900 further comprises a random access memory (RAM) or other dynamic storage device or element as a main memory 915 for storing information and instructions to be executed by the processors 910. Main memory 915 may include, but is not limited to, dynamic random access memory (DRAM).

In some embodiments, in addition to or as a part of the main memory 915, the system 900 includes one or more energy backed hybrid memory modules, wherein such hybrid memory modules may be as illustrated in FIGS. 1 and 3. In some embodiments, the hybrid memory modules are implemented to utilize off module storage, such as SSD 930. In some embodiments, the SSD 930 provides a consolidated storage for each of a plurality of hybrid memory modules 920, such as illustrated in FIGS. 4 and 6.

In some embodiments, the hybrid memory modules and SSD 930 are power protected by an energy source 925, which may include, but is not limited to, a supercapacitor subsystem that includes one or more supercapacitors. In some embodiments, the energy source 925 is charged upon power up of the system 900, and the energy source 925 provides power for backing up data stored on the hybrid memory modules 920 in a power failure or shutdown of the system 900.

The system 900 also may comprise a read only memory (ROM) 935 or other static storage device for storing static information and instructions for the processors 910.

In some embodiments, the system 900 includes one or more transmitters or receivers 940 coupled to the bus 905. In some embodiments, the system 900 may include one or more antennae 944, such as dipole or monopole antennae, for the transmission and reception of data via wireless communication using a wireless transmitter, receiver, or both, and one or more ports 942 for the transmission and reception of data via wired communications. Wireless communication includes, but is not limited to, Wi-Fi, Bluetooth™, near field communication, and other wireless communication standards.

In some embodiments, system 900 includes one or more input devices 950 for the input of data, including hard and soft buttons, a joy stick, a mouse or other pointing device, a keyboard, voice command system, or gesture recognition system.

In some embodiments, the system 900 includes an output display 955, where the display 955 may include a liquid crystal display (LCD) or any other display technology, for displaying information or content to a user. In some environments, the display 955 may include a touch-screen that is also utilized as at least a part of an input device 950. Output display 955 may further include audio output, including one or more speakers, audio output jacks, or other audio, and other output to the user.

The system 900 may also comprise a battery or other power source 960, which may include a solar cell, a fuel cell, a charged capacitor, near field inductive coupling, or other system or device for providing or generating power in the system 900. The power provided by the power source 960 may be distributed as required to elements of the system 900. In some embodiments, the power structure of the system 900 further includes the one or more supercapacitors 925.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

In some embodiments, a memory device includes a plurality of volatile memory chips installed on a circuit board; a controller to provide for backing up contents of the plurality of volatile memory chips in a power loss condition to a nonvolatile storage device that is separate from the memory module.

In some embodiments, the circuit board includes a first side and a second side, and wherein the plurality of memory chips includes a first set of memory chips installed in the first side of the circuit board and a second set of memory chips installed in the second side of the circuit board.

In some embodiments, the connection to the backup energy source is incorporated in a first connector.

In some embodiments, the connection to the backup energy source includes a connection to one or more supercapacitors.

In some embodiments, the memory module is a dual in-line memory module (DIMM).

In some embodiments, backing up contents of the plurality of memory chips includes limiting the contents to be backed up to a partial range of memory based on a setting.

In some embodiments, a system includes a processor for processing of data; an antenna for the transmission of data; a plurality of memory modules, each memory module including dynamic random access memory (DRAM), and a controller to control back up of contents of the DRAM; a data storage device to store data for at least a first set of memory modules of the plurality of memory modules; a storage controller to provide control operation for the storage of the data of the memory modules in the data storage device in a power loss condition for the system; and a backup energy source to provide power to each of the first set of memory modules, the data storage device, and the storage controller.

In some embodiments, the backup energy source is a supercapacitor subsystem including one or more supercapacitors.

In some embodiments, the data storage device is an SSD.

In some embodiments, the storage controller includes a multiplexer to select one of the first set of memory modules.

In some embodiments, the plurality of memory modules includes the first set of memory modules implemented as persistent memory and a second set of memory modules implemented as volatile memory.

In some embodiments, the storage controller to provide control operation for the storage of the data of the memory modules in the data storage device includes the storage control to limit storage of data to a partial range of memory based on a setting.

In some embodiments, a method includes detecting a power loss in a computing system, the computing system including a plurality of memory modules; applying energy from a backup energy source to the plurality of memory modules, to a storage controller, and to a data storage device; and backing up data from each of plurality of memory modules to the data storage device, wherein backing up the data includes the storage controller selecting the plurality of memory modules in a sequence for storage of data from each of the plurality of memory modules.

In some embodiments, the method further includes restoring the data from the data storage device to each of the plurality of memory modules upon power up of the computing system.

In some embodiments, backing up the data from each of the plurality of memory modules includes storing metadata regarding the data backup of each memory modules in the data storage device.

In some embodiments, selecting the plurality of memory modules in a sequence includes selecting the plurality of memory modules according to a priority for each memory module.

In some embodiments, the method further includes removing the energy of the backup energy source from each of the plurality of memory modules upon completion of the backing up of data from each memory module.

In some embodiments, backing up data from each of plurality of memory modules to the data storage device includes backing up a partial range of data from the plurality of memory modules based on a setting.

In some embodiments, a non-transitory computer-readable storage medium having stored thereon data representing sequences of instructions that, when executed by a processor, cause the processor to perform operations comprising: detecting a power loss in a computing system, the computing system including a plurality of memory modules; applying energy from a backup energy source to the plurality of memory modules, to a storage controller, and to a data storage device; and backing up data from each of plurality of memory modules to the data storage device, wherein backing up the data includes the storage controller selecting the plurality of memory modules in a sequence for storage of data from each of the plurality of memory modules.

In some embodiments, the medium further includes instructions for restoring the data from the data storage device to each of the plurality of memory modules upon power up of the computing system.

In some embodiments, backing up the data from each of the plurality of memory modules includes storing metadata regarding the data backup of each memory module in the data storage device.

In some embodiments, selecting the plurality of memory modules in a sequence includes selecting the plurality of memory modules according to a priority for each memory module.

In some embodiments, the medium further includes instructions for removing the energy of the backup energy source from each of the plurality of memory modules upon completion of the backing up of data from each memory module.

In some embodiments, backing up data from each of plurality of memory modules to the data storage device includes backing up a partial range of data from the plurality of memory modules based on a setting.

In some embodiments, an apparatus includes: means for detecting a power loss in a computing system, the computing system including a plurality of memory modules; means for applying energy from a backup energy source to the plurality of memory modules, to a storage controller, and to a data storage device; and means for backing up data from each of plurality of memory modules to the data storage device, wherein the means for backing up the data includes means for selecting the plurality of memory modules in a sequence for storage of data from each of the plurality of memory modules.

In some embodiments, the apparatus further includes means for restoring the data from the data storage device to each of the plurality of memory modules upon power up of the computing system.

In some embodiments, the means for backing up the data from each of the plurality of memory modules includes means for storing metadata regarding the data backup of each memory module in the data storage device.

In some embodiments the means for selecting the plurality of memory modules in a sequence includes means for selecting the plurality of memory modules according to a priority for each memory module.

In some embodiments, the apparatus further includes means for removing the energy of the backup energy source from each of the plurality of memory modules upon completion of the backing up of data from each memory module.

In some embodiments, the means for backing up data from each of plurality of memory modules to the data storage device includes means for backing up a partial range of data from the plurality of memory de modules vices based on a setting.

What is claimed is:

1. A memory module comprising:
   a plurality of volatile memory chips installed on a circuit board; and
   a controller to provide for moving contents of the plurality of volatile memory chips in a power loss condition to a non-volatile storage device that is separate from the memory module, a timing of the moving based on a priority assigned to the memory module that is above or below respective priority levels of other memory modules whose respective contents are also to be moved to the non-volatile storage device in response to the power loss condition, the timing of the moving of the respective contents to impart an orderly flow of the respective contents to the controller for eventual storage in the non-volatile storage device.

2. The memory module of claim 1, wherein the circuit board includes a first side and a second side, and wherein the plurality of volatile memory chips includes a first set of volatile memory chips installed in the first side of the circuit board and a second set of volatile memory chips installed in the second side of the circuit board.

3. The memory module of claim 1, further comprising a connector including a connection to a backup energy source.

4. The memory module of claim 3, wherein the connection to the backup energy source includes a connection to one or more supercapacitors.

5. The memory module of claim 1, wherein the memory module is a dual in-line memory module (DIMM).

6. The memory module of claim 1, wherein backing up contents of the plurality of volatile memory chips includes limiting the contents to be backed up to a partial range of memory based on a setting.

7. A system comprising:
a processor for processing of data;
an antenna for transmission or reception of data for the system;
a plurality of memory modules, each memory module including i) and ii) below:
  i) dynamic random access memory (DRAM), and
  ii) a controller to control back up of contents of the DRAM;
a data storage device to store data for at least a first set of memory modules of the plurality of memory modules, the data storage device being separate from the first set of memory modules;
a storage controller to provide control operation for the storage of the data of the first set of memory modules in the data storage device in a power loss condition of the system, the storage controller to, during the power loss condition, select one of the first set of memory modules to next move its data to the data storage device, the one memory module being selected because it has a higher priority than each of the remaining memory modules of the first set of memory modules who have not yet moved their data to the data storage device, wherein, selection of the one memory module helps to impart an orderly flow of data from the first set of memory modules to the controller for eventual storage in the non-volatile storage device; and
a backup energy source to provide power to each of the first set of memory modules, the data storage device, and the storage controller.

8. The system of claim 7, wherein the backup energy source is a supercapacitor subsystem including one or more supercapacitors.

9. The system of claim 7, wherein the data storage device is a solid state drive (SSD).

10. The system of claim 7, wherein the plurality of memory modules includes the first set of memory modules implemented as persistent memory and a second set of memory modules implemented as volatile memory.

11. The system of claim 10, wherein the storage controller to provide control operation for the storage of the data of the first set of memory modules in the data storage device includes the storage controller to limit storage of data to a partial range of memory based on a setting.

12. A method comprising:
detecting a power loss in a computing system, the computing system including a plurality of memory modules;
applying energy from a backup energy source to the plurality of memory modules, to a storage controller, and to a data storage device that is separate from the memory modules; and
backing up data from each of the plurality of memory modules to the data storage device, wherein the backing up of the data includes the storage controller selecting the plurality of memory modules in a sequence for storage of data from each of the plurality of memory modules, the sequence based on respective priorities assigned to each of the plurality of memory modules, the sequence imparting an orderly flow of the data from the memory modules to the storage controller for eventual storage in the data storage device.

13. The method of claim 12, further comprising restoring the data from the data storage device to each of the plurality of memory modules upon power up of the computing system.

14. The method of claim 12, wherein the backing up of the data from each of the plurality of memory modules includes storing metadata regarding data backup of each memory module in the data storage device.

15. The method of claim 12, further comprising removing the energy of the backup energy source from each of the plurality of memory modules upon completion of the backing up of the data from each memory module of the plurality of memory modules.

16. The method of claim 12, wherein the backing up of the data from each of the plurality of memory modules to the data storage device includes backing up a partial range of data from the plurality of memory modules based on a setting.

* * * * *